(12) United States Patent
Keller

(10) Patent No.: US 8,443,716 B2
(45) Date of Patent: May 21, 2013

(54) METHOD FOR MAKING A PISTON WITH RADICAL PRODUCING MICRO CHAMBERS AND PISTON MADE THEREBY

(75) Inventor: Michael Ira Keller, Alexandria, VA (US)

(73) Assignee: Michael I. Keller Enterprises, Ltd., Alexandria, VA (US)

( * ) Notice: Subject to any disclaimer, the term of this patent is extended or adjusted under 35 U.S.C. 154(b) by 0 days.

(21) Appl. No.: 13/370,924

(22) Filed: Feb. 10, 2012

(65) Prior Publication Data

US 2012/0204714 A1    Aug. 16, 2012

Related U.S. Application Data

(60) Provisional application No. 61/457,251, filed on Feb. 10, 2011.

(51) Int. Cl.
*F16J 1/04*    (2006.01)
*B23P 15/10*   (2006.01)
*F02F 3/00*    (2006.01)

(52) U.S. Cl.
USPC .............................................. 92/231; 92/213

(58) Field of Classification Search
USPC ......... 92/208, 213, 222, 231, 260; 29/888.04, 29/888.042, 888.043, 888.044; 123/193.6
See application file for complete search history.

(56) References Cited

U.S. PATENT DOCUMENTS

| | | | |
|---|---|---|---|
| 2,882,106 A * | 4/1959 | Meurer | ........................... 92/231 |
| 4,898,135 A | 2/1990 | Failla et al. | |
| 5,460,317 A | 10/1995 | Thomas et al. | |
| 5,862,788 A | 1/1999 | Pouring et al. | |
| 6,178,942 B1 * | 1/2001 | di Priolo et al. | .............. 123/273 |
| 7,568,608 B1 | 8/2009 | Ding | |
| 7,832,372 B2 * | 11/2010 | Blank | ........................... 123/256 |
| 2009/0038594 A1 | 2/2009 | Naquin | |

OTHER PUBLICATIONS

International Search Report in corresponding International Application No. PCT/US2012/024683, dated May 23, 2012.

\* cited by examiner

*Primary Examiner* — Michael Leslie
(74) *Attorney, Agent, or Firm* — Bacon & Thomas, PLLC

(57) ABSTRACT

A piston head is formed to have a bowl, micro chambers in the piston body adjacent to the bowl, and orifices providing communication between the micro chambers and the bowl. The micro chambers are formed in the piston head by using grooves that in part define the volume of the reaction chambers, and which are completely sealed from above with permanently secured plugs.

14 Claims, 6 Drawing Sheets

METHOD FOR MAKING A PISTON WITH RADICAL PRODUCING MICRO CHAMBERS AND PISTON MADE THEREBY

CROSS REFERENCE TO RELATED APPLICATIONS

This application claims the benefit of provisional application No. 61/457,251, filed Feb. 10, 2011, the entirety of said application being incorporated herein by reference.

FIELD

The present disclosure relates to a process for fabricating a piston head for a piston type internal combustion engine and a piston produced thereby.

BACKGROUND

Various combustion chamber configurations for direct injected, reciprocating piston, spark and compression ignited internal combustion engines are known and have been described in literature. Combustion chambers and associated chambers for generating radicals and intermediate species of fuel compounds used during combustion of fuel, or for timed autoignition of fuel charges, also have been described. One type of piston for use in such combustion chamber includes a central bowl for receiving the major portion of each fuel and air charge of each combustion cycle. A fuel injector is commonly utilized to inject the fuel of each charge towards the piston bowl in such a combustion chamber configuration, and the bowl communicates with associated micro chambers in the piston or cylinder head via orifices or ports.

A piston arrangement for achieving improved control over ignition and combustion characteristics of a fuel charge in an internal combustion engine and a process for same achieved by the generation and management of fuel radical species within the combustion chamber of such an engine is described in U.S. Pat. Nos. 4,898,135 to Failla et al., 5,862,788 to Pouring et al., and 6,178,942 to di Priolo et al., each of which is incorporated herein by reference in their entirety. These patents disclose using one or more small "reaction chambers" located adjacent the piston bowl which communicate with the bowl through openings or ports that may be configured as slots or discrete orifices. The orifices are configured to produce a lag between gaseous flow of fuel and air (possibly mixed with prior combustion products) into the reaction chamber and the discharge of partially reacted fuel radicals and intermediate species from the reaction chamber into the piston bowl. Reference may be made to the above-mentioned patents for a fuller discussion of radical enhanced combustion and radical induced ignition in reciprocating internal combustion engines.

During each combustion cycle, the portion of the air/fuel charge that is forced into the reaction chamber during combustion and compression phases of a first or an earlier combustion cycle undergoes a cool flame oxidation process to produce fuel radicals and intermediate species that are available for discharge into the bowl of the piston and the combustion chamber above the piston in a next succeeding combustion cycle for seeding the next air/fuel charge provided in the combustion chamber in accordance with a timed process to achieve various objectives, including, for example, more complete combustion, exhaust gas clean-up, autoignition of the charge, etc.

FIG. 1 schematically illustrates an exemplary prior art combustion chamber configuration for a direct injected, compression-ignition, reciprocating piston internal combustion engine 100 using a piston 105 having an annular top side crown or cap 110 fastened to an upper side of the piston body 105. The annular cap 110 has reaction chambers 130, i.e., micro chambers, for containing and generating fuel radical species located in circumferentially spaced relationship about piston bowl 120. The annular cap 110 is configured to adjust the compression ratio of the illustrated combustion chamber above the piston 105. For example, for a lower compression ratio, the volume of the piston bowl 120 would be increased to provide a greater free volume above the piston for the combustion process.

The micro chambers 130 in the prior art piston are formed on the bottom side of the cap 110, which are fastened to the piston body by mechanical fasteners such as bolts. This configuration was necessitated apparently because it was not clear how the micro chambers could be integrated in the main piston body without adversely affecting the structural integrity of the piston.

The use of the cap thus was a necessary expedient to provide micro chambers adjacent the combustion bowl of the combustion chamber with ports between the chambers and the bowl to provide communication between the bowl and the chambers. However, the assembly of a cap on a piston resulted in a piston that was structurally unsound and that would ultimately fail over time due to the stresses of the combustion process. Machining micro chambers in the bowl side wall or providing chambers in the side wall during piston manufacturing also was impractical and costly.

The outer boundary of the reaction chambers 130 obviously encroaches on the backside of any adjacent piston ring recess 140, resulting in a small thickness of piston material between the micro chamber 130 and adjacent piston ring recess 140. Since the overall thickness between the reaction chambers 130 and side wall 150 of the cap is already low, the further encroachment resulting from increasing the volume of the piston bowl 120 leaves a small amount of piston body material to receive a fastener to retain the annular cap 110 on the piston body. This results in a weakened area of the cap adjacent the micro chambers.

The small, i.e., thin, thickness between piston reaction chambers 130 and piston ring recess 140 limits the piston integrity. This leads to problems when fabricating a piston head having a piston bowl 120, reaction chambers 130, and piston ring recess 140.

The present invention resulted from the recognition that there is a need for a process to produce a piston of the type shown in FIG. 1 with a central bowl and micro chambers in the bowl sidewalls that do not require fastening a separate cap fastened on the upper side of a piston body to obtain the micro chambers. Such process must be inexpensive to implement and must result in a structurally sound piston that can withstand the rigors of the combustion cycle of an engine over the life of the piston, while at the same time enabling production of micro chambers in the piston having various volumes and geometrical configurations to accommodate various radical production schemes and the use of the fuel radicals to enhance combustion and/or ignition of the fuel charge in the bowl of the combustion chamber.

SUMMARY

The present invention is directed to a method of making a piston for a reciprocating piston, direct injection type internal combustion engine having a central bowl defining the upper piston side of an internal combustion chamber with micro chambers in the side wall area of the bowl circumferentially spaced about the bowl and in communication with the bowl via orifices or ports that permit passage of air/fuel charge, radicals formed in the micro chambers and possibly radicals from prior combustion events between the bowl and the micro chambers without the use of a separate cap to form the micro chambers adjacent the bowl.

The resulting piston has adequate thickness and strength of piston material in all respects around the bowl, the micro chambers, and the piston ring recesses.

In accordance with the inventive method, micro chambers are formed in the top side of a piston as described above adjacent to the bowl of the piston by machining or otherwise forming grooves in the piston material adjacent the bowl that extend axially and circumferentially in the top side of the piston. The grooves extend axially in depth and circumferentially in length over dimensions suited for the micro chambers to be formed by the inventive method. The grooves also determine the geometry of the micro chambers, as will be evident from the description to follow.

The grooves are each provided with a closure in the form of a close-fitting plug that is placed in the upper ends of the grooves to close the groove from above, while leaving a space between the plug bottom and the bottom of the groove. This space defines the desired micro chamber in the piston after the plug is solidly connected with the piston body material, such as, for example, by welding.

One or more communication ports or orifices is or are also formed between the micro chambers now located at the lower part of the groove covered by the plug and the bowl to provide communication between the micro chambers and bowl.

The plug preferably is formed of piston material or piston compatible material, and the welding, if used, can be carried out using various welding procedures known to those skilled in the art, for example, fusion welding or a process known as friction stir welding that is described in U.S. Pat. Nos. 5,460,317 to Thomas et al. and 7,568,608 to Ding.

The groove that is formed in the piston top side is formed with an undercut sidewall that defines a horizontal ledge in the groove sidewall to receive the plug and to limit its position vertically in the groove so that the micro chamber formed below the plug is precisely defined, and so that the plug is retained in the groove during subsequent welding of the plug to the piston body material. The plug may be formed with a complementary ledge or undercut to engage the ledge of the groove sidewall as well. The plug may be dimensioned to enable press fitting the plug mechanically into the groove prior to welding to hold it in place in the groove, or may simply be dimensioned to fit precisely and snugly in the groove within the groove sidewalls.

An additional finishing step can be applied to the annular top side area of the piston after the plug is welded to the piston body. Friction stir welding or processing uniformly may be used to blend the upper side of the plug or the fusion weld material, depending on how the plug is welded to the piston body material, with the annular top side area of the piston body material, to thereby ensure thermal conductivity between the plug and the piston body material.

The invention also encompasses the piston made by the described process, in particular a piston having micro chambers adjacent a bowl in the piston upper end that are defined by grooves machined or formed in the piston body material extending axially and circumferentially, with plugs sealing the grooves from above to thereby define micro chambers in the grooves below the plugs, with orifices or ports providing communication between the chambers and the bowl.

The numerous advantages, features and functions of the various embodiments of the invention described herein will become readily apparent and better understood in view of the following description and accompanying drawings. The following description is not intended to limit the scope of the single-piece piston with embedded reaction chamber, but instead merely provides exemplary embodiments for ease of understanding.

BRIEF DESCRIPTION OF THE DRAWINGS

Examples of a piston having a central bowl and micro chambers adjacent the bowl formed according to different embodiments of the invention will now be explained in more detail with reference to the drawings, wherein:

FIG. 6 is a cross-sectional view of a piston head having a circular geometric cross-section, where a port is directed into the bowl.

Figure 1:
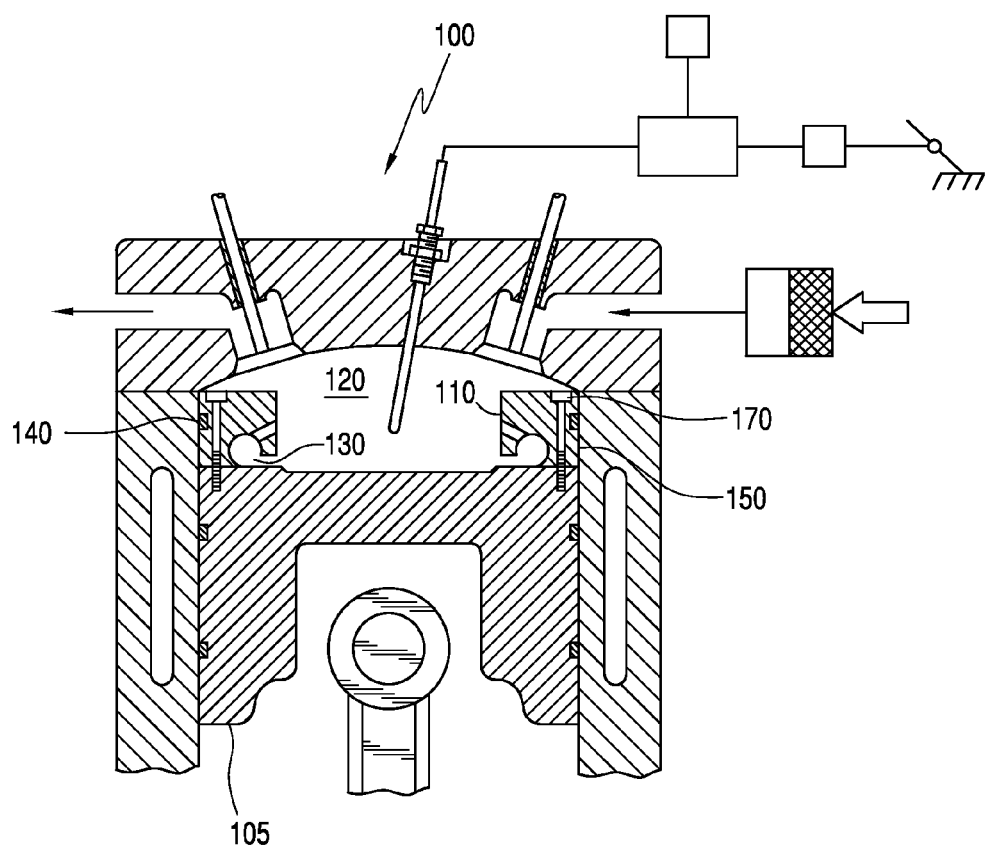
FIG. 1 is a schematic elevation view of a cross section of a combustion chamber of a reciprocating piston-type, direct injected, radical enhanced, non-spark ignited internal combustion engine, showing a prior art arrangement of a piston and radical producing micro chambers in the piston crown area adjacent a piston charge receiving bowl.

In the various figures, similar elements are provided with similar reference numbers. It should be noted that the drawing figures are not necessarily drawn to any scale, or proportion, but instead are drawn to provide an understanding of the method according to the invention and the resulting piston form and components. Thus, the illustrations are not intended to be limiting as to the scope of the invention described herein, but rather to provide exemplary illustrations thereof.

DETAILED DESCRIPTION OF ILLUSTRATIVE EMBODIMENTS OF THE INVENTION

A. Discussion of Various Embodiments

As generally discussed above, a prior art piston provided with micro chambers in the piston head with a bowl, piston cap and fasteners has poor structural integrity, since the metal thickness of the piston head between the bowl, micro chambers, fasteners, and adjacent piston ring grooves is relatively small, and the fastener arrangement is simply not practical in a production internal combustion engine. To overcome this deficiency, the present invention was developed for attaining a robust piston with a bowl and micro chambers that has better structural integrity, is simple to manufacture and is commercially practical.

Specifically, the method comprises integrally forming the micro chambers in the piston head by first machining a groove for each chamber that extends axially and circumferentially of the piston body in the top area of the piston adjacent to the bowl, and then sealing the upper end of the groove with a plug that is permanently and integrally welded with the piston body so as to leave an open space beneath the plug in the groove that defines a micro chamber. Orifices or ports are also machined in the piston body adjacent to the bowl and provide communication between each micro chamber and the bowl.

Figure 2A:
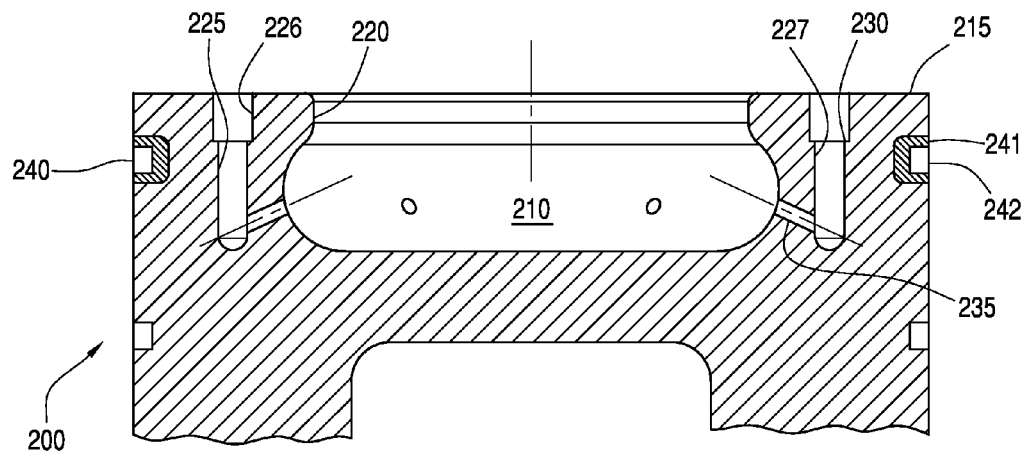
FIG. 2A is a cross-sectional elevation view of a piston head showing a first exemplary embodiment of a method for forming micro chambers in a piston head using axially and circumferentially extending grooves in the piston adjacent the piston bowl that will define micro chambers after being covered with a plug.
Figure 2B:
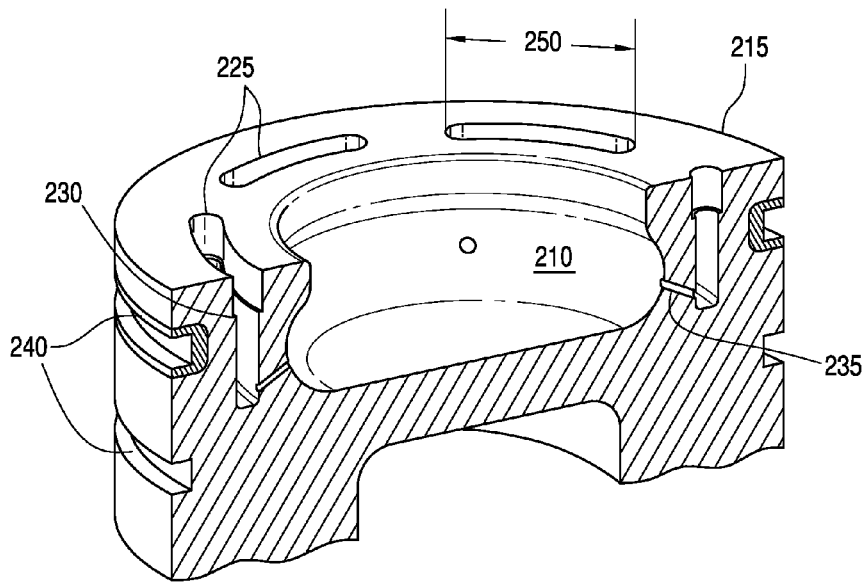
FIG. 2B shows an isometric view of the piston head cross section illustrated in FIG. 2A showing the grooves in more detail.

As seen in FIG. 2A, a piston having a piston head 200 is provided with a bowl 210 formed in the upper side of the piston head. The piston body including the piston head is typically made from a metal, for example, steel or an appropriate aluminum alloy. Such aluminum alloy, for example, may comprise between 5% and 15% of silicon, e.g., 4032, 4043, 3003, 3004, 5052, 6061, 6063 Aluminum or 443, 355, 356, 214. The basic piston and bowl 210 may be formed by any appropriate process known to those skilled in the relevant art.

The piston bowl 210 is surrounded by an annular top side area 215 that intersects at an inner periphery an axially extending lip 220 that defines the upper end of the bowl 210. As shown, the bowl may have a greater maximum diameter below the lip 220 for facilitating the combustion process.

After forming the bowl 210, circumferentially extending grooves 225 having a width and depth are formed axially in the annular top side area 215 and are spaced at a predetermined distance from the bowl lip 220. Each groove 225 has an upper part 226 and a lower part 227 (see FIG. 2A), where the lower part is used to form a micro chamber to be described below. A wall protrusion or undercut 230 is created in the groove side wall to form a horizontal (radial) ledge surface between the upper part 226 and the lower part 227, so that the lower part 227 has a smaller width than the upper part 226.

The grooves 225 extend circumferentially along a given length 250 of the annular top side area of the piston head 215, where each length 250, for example, is spaced apart at equal radial distances from the center of the bowl 210 and, for example, equally spaced circumferentially from each other. The grooves may have appropriate geometric shapes defining at their lower ends desired cross-sections of the micro chambers, e.g., rectangular, curvilinear, circular, etc. The number of grooves 225 is determined by the specific requirements of the micro chambers given the application of the piston head for the internal combustion engine.

Known methods in the art may be used to form the grooves 225 in the annular top side area of the piston head. For example, a machine tool can be used to remove piston material from the annular top side area of the piston to form the grooves 225 so that a desired volume of the micro chamber is obtained while forming the sidewall undercut or ledge 230 between the upper and lower groove parts.

As discussed above, the lower part 227 of each groove 225 will define a volume of desired micro chambers. The micro chambers are intended to produce, store and supply fuel radicals and intermediate species for use in the combustion zone within the bowl 210, and which are supplied to the bowl area through orifices 235 extending between the bowl and the micro chambers, as described in U.S. Pat. No. 4,898,135. The orifices 235 are preferably machined between the lower part 227 of the groove 225 and the bowl 210 after the formation of the grooves 225. The orifices 235 are arranged to receive a portion of a fuel and air of a charge supplied to the combustion chamber and piston bowl in a first combustion cycle for a timed transfer to the micro chamber and to discharge fuel radicals and intermediate species from the micro chambers in a following combustion cycle, for example, as described in U.S. Pat. No. 4,898,135. The orifices 235 may be oriented so as to intersect the micro chambers in a manner to optimize the fluid circulation reaching and circulating within the micro chambers.

The top piston ring groove 240 is typically provided adjacent the annular top side area of the piston head opposite the groove 225, as shown. The ring groove 240 is arranged to receive a piston ring (not shown) with or without a piston ring carrier 241 having a recess 242 for receiving the piston ring. The skilled person will understand that the ring groove 240 can also be formed during the production of the piston head or formed after the completed fabrication of the basic piston head 200. The piston ring carrier 241, if provided, reinforces the piston ring for support during the operation of the piston, as is known. For example, high temperatures, pressures, and vibration forces are generated during the operation of an internal combustion engine, which are translated to the piston and piston ring. The piston ring carrier 241 is made from a material that increases the wear resistance of the ring groove by resisting these forces.

Figure 3A:
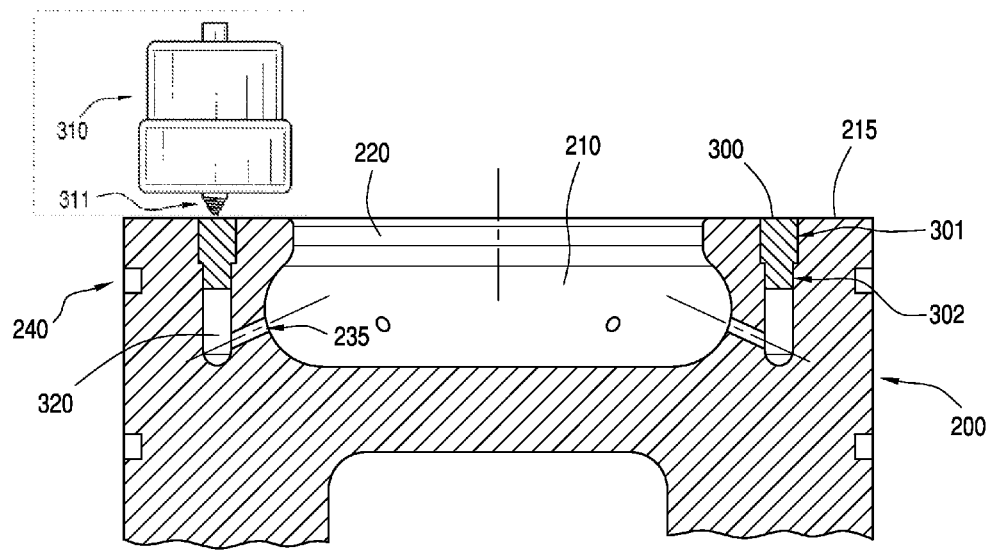
FIG. 3A is an elevation cross-sectional view of the cross section of the piston head of FIG. 2A with a plug inserted into the groove up to desired depth which is being permanently secured to the piston body using a friction-stir welding process.

After the formation of the basic piston head 200 with the bowl 210, the grooves 225, and/or the ring grooves 240, a plug 300 (see FIG. 3A) is inserted into each groove 225 to cover and close the groove 225 completely in a close fitting relationship or by a press-fit in the groove upper part. As seen in FIG. 3A, the plug 300 has an upper portion 301 which has substantially the same width as the upper part 226 of the groove 225 and a lower portion 302 that has substantially the same width as the lower part 227 of the groove 225. The plug 300 also has an undercut on each side that cooperates with the horizontal ledge 230 of the groove in which it is placed, although the plug could be configured to merely sit on the horizontal ledge 230 on its bottom side edges. Since the plug 300 has a corresponding shape to the groove 225, the horizontal sidewall ledge 230 is arranged to support the plug 300 at a desired depth and to assure that the plug 300 is properly installed in the groove 225. The wall ledge 230 is designed so that when vertical or axial pressure is exerted on the inserted plug, e.g., during press fitting or friction-stir welding or other machining operations involving the plug, the wall ledge will support, i.e., maintain, the plug at the desired location.

The plug, in particular the upper portion 301 of the plug 300, has a height to facilitate permanently securing the plug 300 to the piston head 200. For example, if the plug 300 is secured by friction-stir welding, as discussed below, the plug has a height so that an upper surface of the upper portion 301 is supported substantially flush with the piston annular top side area 215. If, however, the plug 300 is to be permanently secured to the piston head 200 by fusion-welding, the plug 300 has a height lower the annular top side area 215 when the plug 300 is initially placed in the groove 225 to facilitate the welding and weld filling process.

The lower portion 302 of the plug 300, including any portion below the ledge 230, on the other hand, may have a height determined by the desired volume of the micro chamber. As discussed above, the wall ledge 230 stops the plug 300 vertically so that an open area 320 of the groove 225 is formed beneath the plug 300, i.e., a lower surface of the lower portion 302 is used to form the top surface of the micro chamber. Thus, the open area 320 forms the micro chamber, i.e., the desired volume of the micro chamber required for the reaction of fuel and air to form fuel radical species which are supplied into the bowl 210.

The plug 300 preferably is made of a metal, alloy, or high density composite that is compatible with or the same as the piston. The material of the plug is based on not only compatibility, but also on piston performance in the combustion engine. For example, if the piston head body 200 is made from aluminum alloy, the plug 300 is made from the same aluminum alloy.

As seen in FIG. 3A, friction-stir welding, as disclosed in U.S. Pat. No. 5,460,317 to Thomas et al. and U.S. Pat. No. 7,568,608 to Ding, each of which is incorporated by reference in its entirety, can be used to permanently secure the material compatible plug 300 to the piston head 200.

As discussed above, when friction stir welding is used to permanently secure the plug 300 in a respective groove, the plug 300 has a height configured so that the upper surface of the upper portion 301 of the plug 300 is supported substantially flush with the piston annular top side area 215. A friction stir welding device 310 having a rotating and penetrating probe 311 is used to homogenize a portion of the upper portion 301 of the plug 300 with the metal or material of the piston head 200 to secure the plug 300 in the respective groove 225 with a gas tight seal.

Figure 3B:
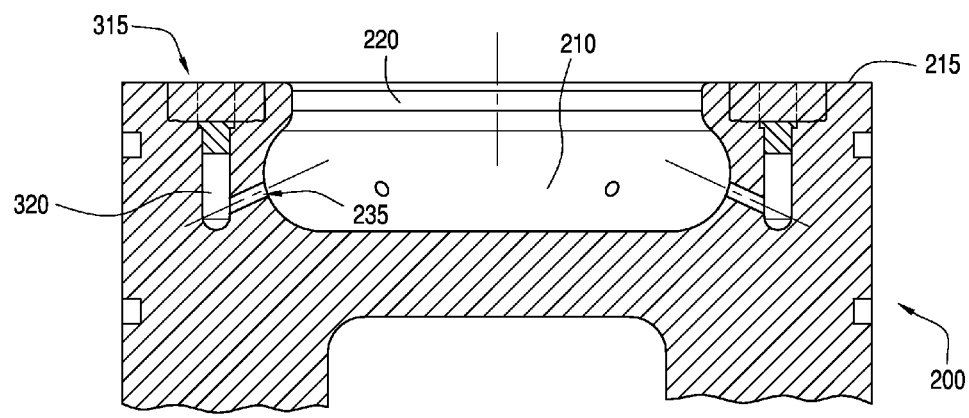
FIG. 3B shows the welding area surrounding the upper side of the plug at the annular top side area of the piston head resulting from friction stir welding as illustrated in FIG. 3A.

As seen in FIG. 3B, by traversing the friction stir welding device 310 over and around the plug 300 in the groove 225, the rotating probe 310 produces a local region of highly plasticized piston and plug material that hardens and solidifies after completion of the process. The mechanical motion generates frictional heat in the plasticized material so that the rotating probe 310 can spread the unified plasticized material of the piston body and the plug along the joint forming homogenized portion 315. In other words, both the piston head 200 around the groove 225 and the plug are plasticized and mixed, so that the piston head 200 and plug 300 are uniformly joined.

Additionally, the skilled person would understand that an additional step of friction stir processing can be applied to substantially the entire annular top side area 215 of the piston head 200 so that the entire top side area is homogenized, i.e., uniformly mixed. The friction-stir processing provides a very fine grain structure across the entire piston annular top side area and eliminates any voids that may have been created during the casting process or other piston body forming method.

Figure 3C:
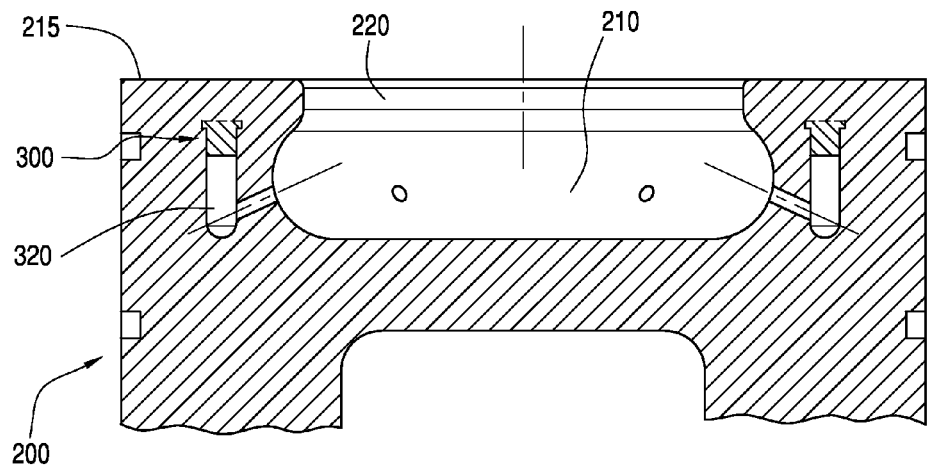
FIG. 3C shows the finished welded and blended upper side of the plug and the adjacent piston body material at the upper side of the piston adjacent the bowl.

FIG. 3C illustrates the uniform joining of the plug 300 and piston head 200 after the friction stir welding the plug 300 with the annular top side area 215. When the plasticized material is cooled, the homogenized portion 315 is a composite of the piston head 200 and the plug 300. The uniform blending of the upper portion 301 of the plug 300 with the annular top side area 215 of the piston head 200 permanently secures the plug 300 in the groove 225 and forms desired micro chambers 320 from the open areas beneath the plug 300 without the need for using a separate fastened piston cap to form the micro chambers.

Figure 3D:
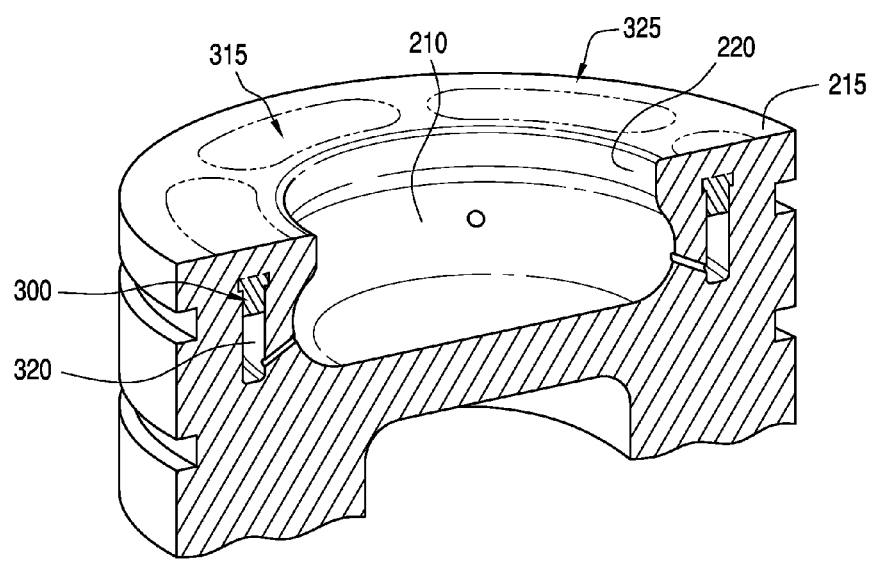
FIG. 3D is an upper isometric view illustrating the final processed piston head shown in FIG. 3C with the plug integrated with the piston body material.

FIG. 3D is an exemplary embodiment of the piston head 200 after friction-stir welding. Imaginary periphery lines 325 illustrate the area of homogenization between the piston head 200 and plug 300 above the grooves 225. When the homogenization portions 315 are cooled, micro chambers 320 are formed that extends circumferentially along the length of the annular top side area 215. By uniformly joining the plugs 300 having upper portions with the piston head 200, the micro chambers, i.e., open spaces 320, are formed in the solid piston head adjacent the bowl 210 without using a bolt-on or fastened cap element.

Moreover, the skilled person will appreciate that the homogenization of the plug 300 and piston head 200 does not occur near the wall ledges 230. As discussed above, the wall ledges 230 are used to position and support the plug 300 to create the open areas 320 for the micro chambers in the piston head. If the wall protrusions 230 were homogenized, support for the plug would not be provided, since the wall protrusions would be plasticized, which would likely result in the plug being pressed further into the groove than desired from the pressure generated during the friction stir welding.

Figure 4A:
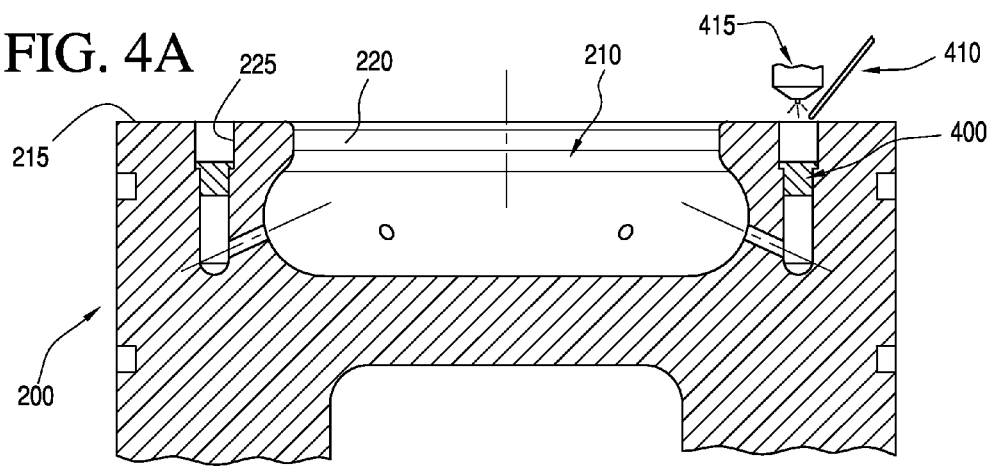
FIG. 4A shows an elevation view of the cross-sectional of the piston head with a different embodiment of a plug inserted into the groove in preparation for the plug to be permanently fusion welded to the piston body material.

FIG. 4A illustrates another embodiment of a robust piston in accordance with the present invention that has structural integrity for an internal combustion engine. In this embodiment, circumferentially extending grooves 225 are provided in the piston head along annular top side area 215 of the piston adjacent to the piston bowl 210, as discussed above. The plug 400, however, in this example, has a height such that the upper end of the plug is below the upper end of groove 225, so that when the plug 400 is placed into the groove 225, a top end of the plug 400 is not flush with the annular top side area 215, but lies below the top side area.

Figure 4B:
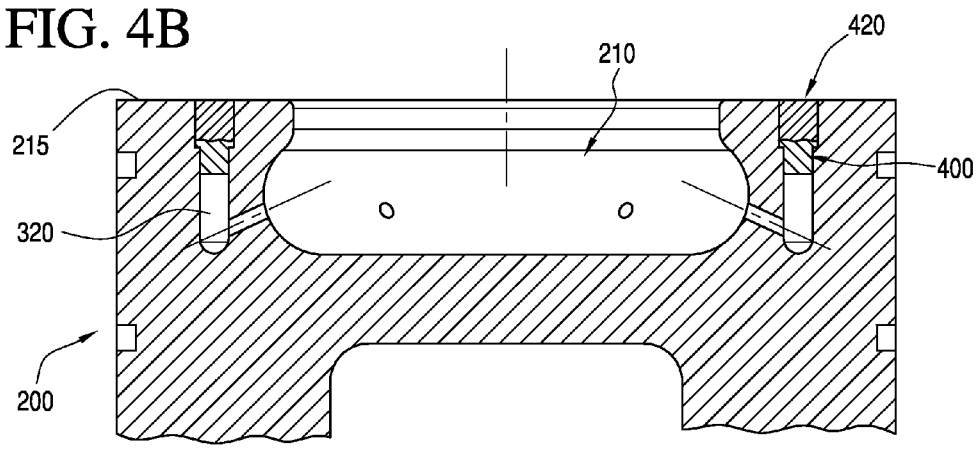
FIG. 4B shows the plug welded to the piston body illustrating the weld area above the plug.

Plug 400 is then permanently secured into the groove 225 by fusion-welding the plug to the piston groove sidewalls and covering the top side of the plug 400 with welding filler metal 410 by using, for example, a heating source 415, to achieve final sealing of the plug and closing of the groove. In other words, as shown in FIG. 4B, the fusion-welding method provides a filling layer of weld metal forming welded portion 420 over the plug 400 until the top side of the fill metal is flush with the annular top side area 215 of the piston head 200. Thus, the plug 400 is welded to the filler metal and the plug and filler together to form a single, solid plug closing the groove 225 in an integrated manner with the piston body.

The material of welding wire 410 used for the fusion welding typically will be compatible material with the piston head 200 and the plug 400.

Figure 4C:
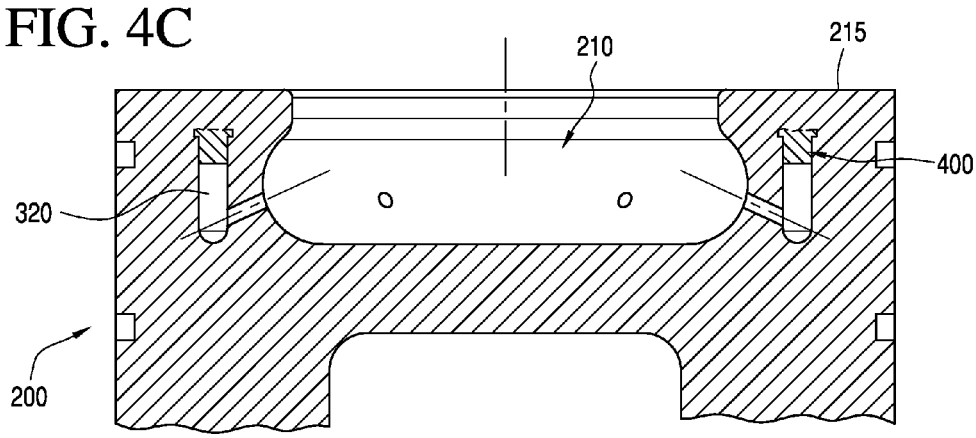
FIG. 4C shows the finished welded plug shown in FIG. 4B.

As discussed above, an additional finishing step can be applied after the fusion-welding of the plug 400. For example, friction stir processing can be applied to the piston head so that the entire annular top side area 215 is homogenized with the welded layer, i.e., uniformly blended to have the same grain structure between the piston head and deposited welded layer. As seen in FIG. 4C, the final piston head results in a robust piston, since the plug 400 is permanently secured beneath the homogenized welded layer and piston head.

The skilled person will appreciate that the permanent securing of the plug to the piston body is not limited to the aforementioned methods. For example, any known method can be used to weld the plug to the piston head, e.g., arc, stick, sonic, electron beam, TIG, MIG, GTAW, by following the methods as discussed above.

While the foregoing embodiments have been described and shown, it is understood that alternatives and modifications of these embodiments, such as those suggested by others, may be made to fall within the scope of the disclosure. Moreover, any of the principles described herein may be extended to any other device or other types of articles requiring similar functions of those structural elements described herein.

Figure 5:
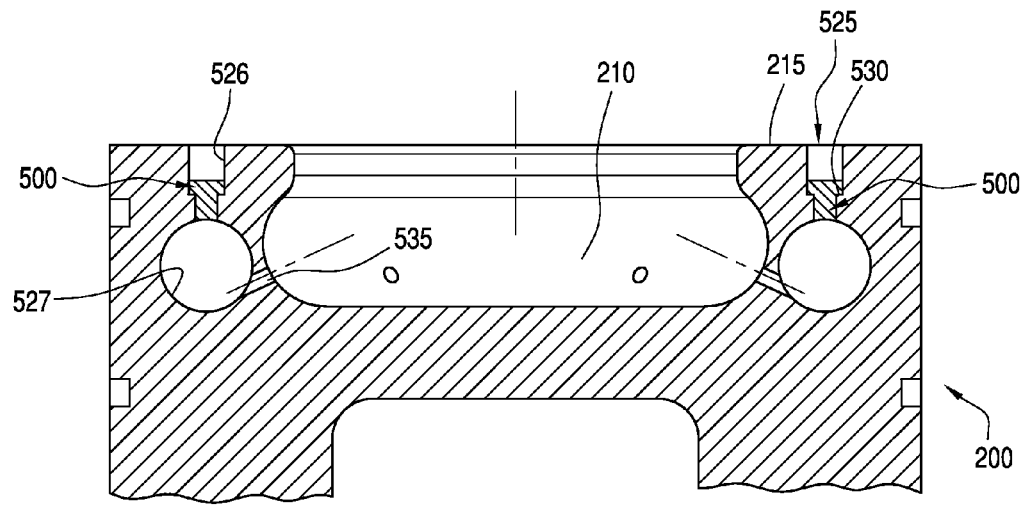
FIGS. 5 and 6 are elevation views of a cross-section of a piston head with micro chambers having a circular cross-sections, and different port orientations providing communication between the chambers and the bowl of the piston, with plugs installed in the grooves but not yet welded in place.
Figure 6:
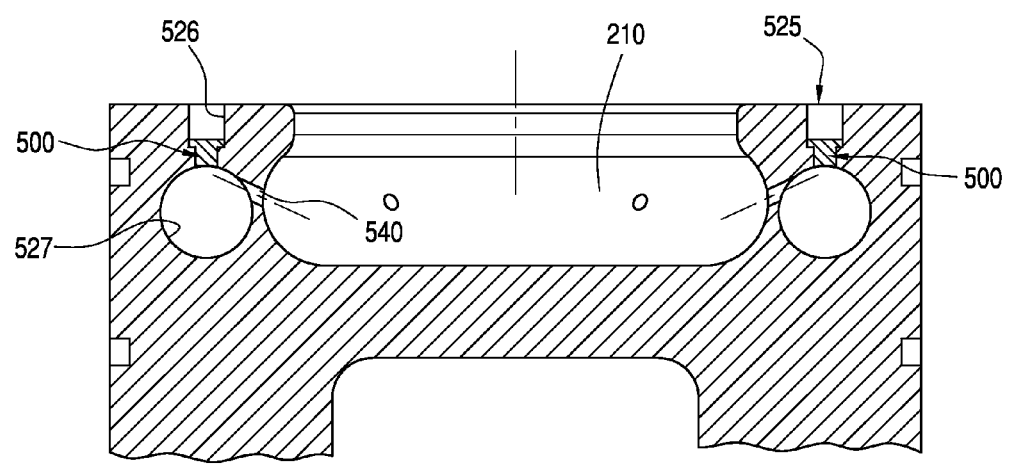

For example, as seen in FIGS. 5 and 6, a lower part 527 of circumferentially extending grooves 525 may have a circular cross section as shown. In this embodiment, grooves 525 are formed axially into the annular top side area 215. The grooves 525 have an upper part 526 and a lower part 527, where the lower part 527 is used to form a micro chamber. A wall undercut or ledge 530 is created in the groove between the upper part 526 and the lower part 527. Thus, the bottom area of the groove may be custom formed to produce desired geometric configurations of micro chambers.

Similar to the embodiments disclosed above, a plug has a height to facilitate permanently securing the plug to the piston head 200, e.g., a height so that an upper surface of the upper portion is supported substantially flush with the piston annular top side area or a height lower than the annular top side area 215 when the plug is initially placed in the groove 525.

As shown in FIGS. 5 and 6, when plug 500 is placed into the groove 525 on ledge 530, the plug 500 has a height lower than the annular top side area 215. The bottom surface of the plug 500 matches the cross-sectional geometry of the lower part 527 of the groove 525, so that the bottom surface of the plug 500 forms the top surface of the micro chamber.

As seen in FIGS. 5 and 6, the ports or orifices 535 or 540 are machined between the grooves 525 and the bowl 210 typically after the formation of the grooves 525. The orifices 535 or 540 are arranged to receive a portion of the fuel and air of each charge for transfer to the micro chambers and to discharge fuel radical and intermediate species into the bowl in a next combustion cycle. The ports or orifices 535 or 540 may be oriented diagonally relative to the micro chambers to create a swirl effect in the chamber to enhance radical formation.

Known methods may be used to form the grooves 525 in the annular top side area of the piston head. For example, a milling tool (not shown) can be used to remove the piston material from the annular top side area of the piston to form the desired volume of the micro chamber and wall ledge 530 between the upper and lower groove parts.

The invention is not to be limited by the description of exemplary embodiments of the invention, but only by the scope of the appended claims. For example, the steps for forming the piston with radical producing micro chambers are not limited to particular sequential steps for forming the parts of the piston head, but can be performed in any specific order.

The invention claimed is:

1. A method of forming a piston having a piston head to provide micro chambers for creating and supplying charge ignition radicals to a combustion zone defined in part by the piston head, the piston having an axial length, an annular top side area surrounding a bowl, the bowl formed by a depression in the top side of the piston head, a top piston ring groove adjacent the piston top side area, comprising the steps:

forming at least one axially and circumferentially extending groove in the annular top side area of the piston, said groove extending circumferentially along a given length of the annular top side area and defining a length of the micro chamber to be formed in the piston;

covering and sealing the groove completely with a plug formed of piston material or piston compatible material while leaving an open area of the groove beneath the plug, said open area defining a volume of the desired micro chamber;

permanently securing the plug and piston together; and providing at least one orifice providing communication between the bowl of the piston and the open area of the groove below the plug.

2. The method according to claim 1, including forming the bottom area of the groove below the plug in a predetermined geometrical shape defining a desired cross-section shape of the micro chamber.

3. The method according to claim 1, wherein the step of permanently securing the plug to the piston comprises welding.

4. The method according to claim 3, wherein the welding step is friction-stir welding while the plug is supported flush with the piston annular top side area.

5. The method according to claim 1, including forming plug supporting wall ledges in the groove sidewall in a way such that the ledges support the plug upon placement of the plug in the groove.

6. The method according to claim 1, wherein the plug and piston material are identical.

7. The method according to claim 3, wherein the welding step is carried out with final finishing to leave a plug top side flush with the annular top side area.

8. A piston having an axial length comprising:

a piston head having a bowl and an annular top side area surrounding the bowl, said bowl formed as a depression in the top side of the piston head;

a top piston ring groove adjacent the piston top side;

at least one axially and circumferentially extending groove in the annular top side area of the piston, wherein said groove extends circumferentially along a given length and defining a length of at least one micro chamber to be formed;

a plug permanently secured in the groove to the piston arranged to cover and seal an upper portion of the groove while leaving an open area of the groove beneath the plug, wherein the open area in the groove beneath the plug defines a volume of the micro chamber, wherein said plug is formed of piston material or piston compatible material, wherein the at least one micro chamber is formed in the piston head for creating and supplying charge ignition radicals to a combustion zone defined in part by the head of the piston; and at least one orifice arranged to provide communication between the bowl of the piston and the open area of the groove beneath the plug.

9. The piston according to claim 8, wherein the bottom area of the groove below the plug is formed as a predetermined geometrical shape defining a desired cross-section of the micro chamber.

10. The piston according to claim 8, wherein the plug is permanently welded to the piston.

11. The piston according to claim 10, wherein the plug is friction stir welded to the piston, and wherein the plug is supported flush with the piston annular top side area.

12. The piston according to claim 8, wherein the groove comprises supporting wall ledges arranged to support the plug upon placement of the plug in the groove.

13. The piston according to claim 8, wherein the plug and piston material are identical.

14. The piston according to claim 10, wherein the plug top side is covered with fill metal, so that plug and fill metal is flush with the annular top side area.

* * * * *